United States Patent Office 3,029,582
Patented Apr. 17, 1962

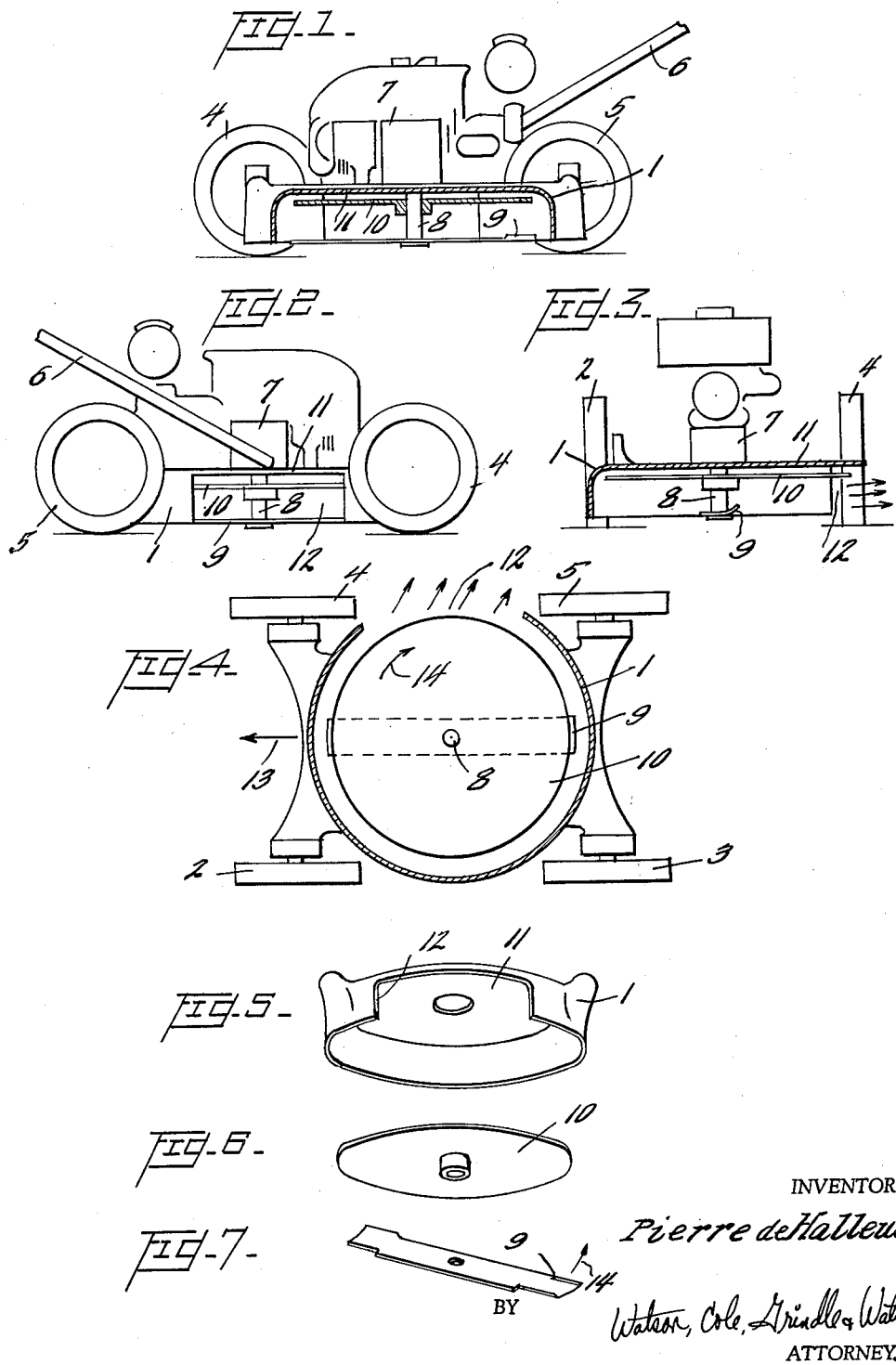

3,029,582
GRASS SHEARING MACHINE WITH HORIZONTAL KNIFE
Pierre de Halleux, 31 Ave. de l'Escrime, Woluwe St. Pierre, Brussels, Belgium
Filed Feb. 25, 1959, Ser. No. 795,422
Claims priority, application Belgium Mar. 1, 1958
1 Claim. (Cl. 56—25.4)

The present invention relates to grass shearing machines and in particular to shearing machines comprising a horizontal knife.

Grass shearing machines of this kind substantially comprise a housing mounted on four wheels and carrying a motor with a vertical shaft. A horizontal knife is fixed to the end of the motor shaft which cuts the grass when the machine is moved and throws it in a direction determined by an opening in the housing.

Shearing machines of this kind have disadvantages which are essentially of two kinds.

When the grass is wet or when earth is removed by the knife, a clump of earth and grass is often formed inside the housing, as a result of which the knife is checked in its movement and the motor stalls. It may also happen that lumps of this kind become detached from the machine and fall onto the grass, thereby flattening the grass and rendering it difficult to cut.

Furthermore, it is necessary to be able to remove the cut grass easily and completely. In known types of shearing machines, however, the discharge opening is cut out of the sheet metal of the housing, so that the entire edge of the hole is formed by a vertical metal edge which tends to trap the grass at it is thrown out in a direction at right angles to the plane of this metal surface.

Accordingly, it is an object of this invention to obviate these disadvantages and to provide a grass shearing machine with horizontal knife which can be relied upon to cut the grass satisfactorily even when the ground is irregular or covered with molehills or when the grass is wet, and which will always empty itself easily and completely without any risk of obstruction.

Briefly in accordance with aspects of this invention, the grass shearing machine employs a horizontal knife and a rotary member, such as a disc fixed to the motor shaft which drives the knife. Advantageously, the rotary member is situated above the knife, in the upper part of the housing, for example near the roof. In one illustrative embodiment of this invention, the surface of the disc or the like almost entirely covers the underside of the roof of the housing or has a diameter slightly smaller than the diameter of the housing.

For the purpose of rapid and complete removal of the grass, the machine has an opening extending practically over the entire height of the housing, starting approximately at the level of the roof and having no lower border.

The discharge opening is so placed that the grass has the smallest possible distance to traverse in the housing before being discharged.

In practice, this means that the opening is situated between the two wheels which are on the right hand side when the machine moves forwards, if the knife and disc rotate from left to right in the clockwise sense.

These and various other objects and features of this invention will be more clearly understood from a reading of the detailed description of this invention in conjunction with the drawing in which:

FIGURE 1 shows a side elevation, partly in section, of a grass shearing machine according to one illustrative embodiment of this invention.

FIGURE 2 is a side elevation of the machine, showing the discharge opening for the cut grass.

FIGURE 3 is an end view of the shearing machine of FIGURE 1 partly in section.

FIGURE 4 is a plan view of the shearing mechanism, with the top of the housing removed.

FIGURE 5 is a view of the housing in perspective.

FIGURE 6 is a view of the disc in perspective.

FIGURE 7 is a view of the knives in perspective.

As shown in these drawings, the grass shearing machine comprises a housing 1 mounted on four wheels 2, 3, 4, and 5, and moved by a steering handle 6.

The housing 1 carries a motor of any desired kind with a vertical shaft 8 which actuates the knives 9.

According to one illustrative embodiment of the invention, the shaft 8 carries, in addition to the knives 9, a rotary member, for example a disc 10, disposed at a certain distance above the knives near the top 11 of the housing 1. For example, the surface of this rotary member almost entirely covers the underside of the roof 11 or has a diameter which is slightly less than the diameter of the housing. For rapid and complete removal of the cut grass, the housing 1 has an opening 12 which extends over the entire height of the housing, starting approximately at the upper level of the ceiling 11 and having no lower border. This discharge opening 12 is so placed in the wall of the housing that the cut grass traverses the smallest possible distance inside the housing before it is thrown out. For example, this opening 12 is situated between the two side wheels which are on the right hand side when the machine is viewed in the direction of movement indicated by the arrow 13. The knives 9 and the disc 10 rotate from left to right, in the clockwise sense, as shown by the arrow 14. This opening 12 enables the cut waste to be thrown out sideways in the direction indicated by the arrows.

Under these conditions, owing to the presence of the rotary disc 10 directly underneath the top of the housing 1, no accumulations can form or adhere to the top because the rotation of the disc ejects any waste matter, even when it is wet or earthy. As a result, it is possible to cut grass even in the rain or on ground which is uneven, for example when covered with molehills.

Furthermore, the disc 10 acts as a fly wheel which increases the effectiveness of the motor when cutting is difficult, for example when the grass is wet or the ground is covered with molehills, bushes, shrubs or the like.

The discharge opening 12 does not obstruct the discharge of the waste, either above or below the blade 9.

The internal surface of opening 12 in housing 1 has vertical edges which limit the opening, as shown clearly in FIGURE 5 in perspective.

This arrangement has the advantage of providing an unobstructed opening for the exit of the grass. Furthermore, it allows a grass collecting device to be attached quite easily at the side of the housing 1.

While I have shown and described one embodiment of my invention, it is understood that the principle thereof may be extended to many and varied types of machines and apparatus. The invention, therefore, is not to be limited to the details illustrated and described herein.

What I claim is:

In a grass shearing machine, a housing, drive means mounted on said housing and having a shaft projecting therethrough, knife means mounted on said shaft within said housing, and a circular rotary member mounted on said shaft in the upper part of said housing, said housing having an opening in the wall thereof for the passage of grass therethrough, said machine including a front and rear set of wheels, said opening being located between said front and rear wheels and extending from the upper wall of said housing for the entire side of said housing between said wheels.

References Cited in the file of this patent

UNITED STATES PATENTS

| | | |
|---|---|---|
| 2,641,100 | Sylvester | June 9, 1953 |
| 2,669,827 | Brownlee | Feb. 23, 1954 |
| 2,760,327 | Bovee | Aug. 28, 1956 |
| 2,796,714 | Denney | June 25, 1957 |
| 2,802,327 | Thelander | Aug. 13, 1957 |
| 2,876,609 | Swanson | Mar. 10, 1959 |